United States Patent [19]

Hui

[11] 4,229,808
[45] Oct. 21, 1980

[54] METHOD FOR RECORDING MULTIPLE DATA SEGMENTS ON A STORAGE DISC WITH ECCENTRICITY FACTOR

[75] Inventor: Peter W. Hui, Poway, Calif.
[73] Assignee: NCR Corporation, Dayton, Ohio
[21] Appl. No.: 971,975
[22] Filed: Dec. 21, 1978
[51] Int. Cl.$^2$ .................. G11C 13/04; H04N 5/76
[52] U.S. Cl. ................... 365/234; 358/128.5; 360/48
[58] Field of Search .................. 360/48, 49, 50; 358/128; 179/100.3 V; 365/215, 234

[56] References Cited

U.S. PATENT DOCUMENTS

| | | | |
|---|---|---|---|
| 3,040,299 | 6/1962 | Crosby et al. | 360/39 |
| 3,546,686 | 12/1970 | McPherson et al. | 360/48 |
| 3,911,483 | 10/1975 | Kihara et al. | 360/33 |
| 3,938,105 | 2/1976 | Lechner | 360/48 |
| 4,001,883 | 1/1977 | Strout et al. | 360/48 |
| 4,016,603 | 4/1977 | Ottesen | 360/135 |
| 4,017,678 | 4/1977 | Baker | 358/128 |
| 4,030,130 | 6/1977 | Smith | 360/77 |
| 4,052,750 | 10/1977 | Barber et al. | 360/135 |
| 4,068,851 | 1/1978 | Yamamura | 274/39 |
| 4,091,454 | 5/1978 | Kauffmann | 360/135 |
| 4,094,010 | 6/1978 | Pepperl et al. | 365/234 |
| 4,142,209 | 2/1979 | Hedlund et al. | 365/234 |

OTHER PUBLICATIONS

Broadbent, A Review of the MCA Disco-Vision System, Presented at the 115th SMPTE Technical Conference and Equipment Exhibit in Los Angeles, Calif., 4/26/74.

*Primary Examiner*—Stuart N. Hecker
*Attorney, Agent, or Firm*—J. T. Cavender; Albert L. Sessler, Jr.; Elmer Wargo

[57] ABSTRACT

A method of recording multiple segments of data on a high-density disc such as an optical disc when the recording of data is done on a non-continuous basis. The method comprises: recording first data in a first portion of the tracks on the disc; recording at least a first reference file associated with the first data in a second portion of the tracks adjacent to the first portion, with the second portion including a last recording track; recording a character which is repeated in a third portion of the tracks to signify the end of the first data and the associated reference file; and leaving a recording gap on the optical disc between the third portion and a fourth portion, which fourth portion will subsequently be used for recording second or additional data thereon. Coherent light is used to electro-optically record on the disc.

5 Claims, 4 Drawing Figures

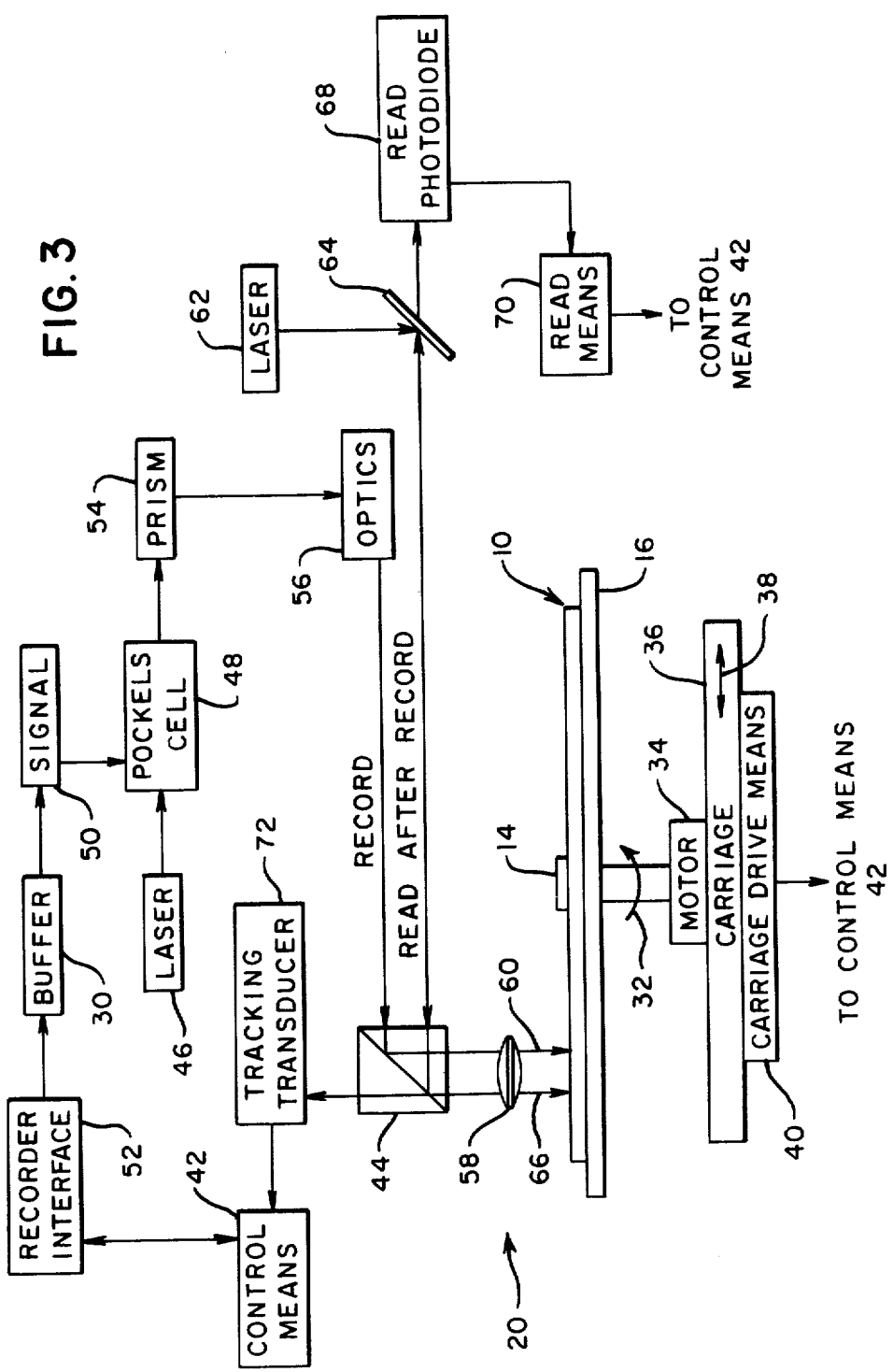

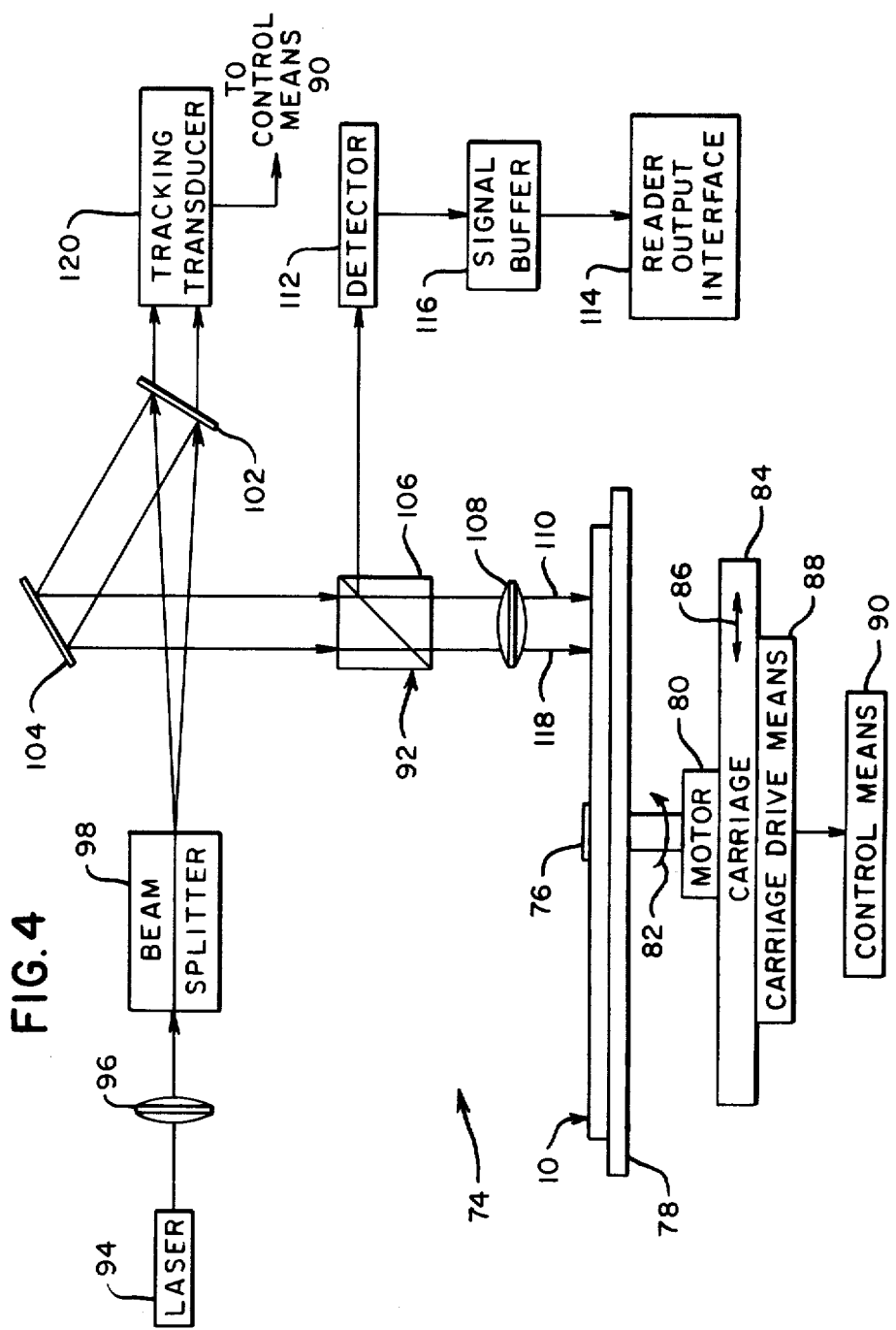

METHOD FOR RECORDING MULTIPLE DATA SEGMENTS ON A STORAGE DISC WITH ECCENTRICITY FACTOR

BACKGROUND OF THE INVENTION

This invention relates to a method of recording multiple segments of data on a high-density disc such as an optical disc when the recording of data is done on a non-continuous basis.

The recording of data on an optical disc of the type used in this invention, is generally done on a one-time basis, i.e. all the data which is to be recorded thereon is done at one time, with the recording of data being effected in a continuous manner from the beginning track thereon to the ending track thereon. The data recorded on the disc is non-eraseable nor is the disc re-useable, as the disc forms a permanent record for the data recorded thereon.

One of the problems which occurs when recording on a high-density disc of the type described on a non-continuous basis is that when an additional segment of data is to be recorded on a disc which already has a segment of data recorded thereon, some partial destruction of the data already on the disc may result. This partial destruction of data is generally due to the fact that the recording tracks on the discs are extremely close to one another, and any eccentricity in the disc itself or in the associated recording apparatus which is used to record the additional segment of data may cause some "recording over" the previously recorded segment of data. This is especially true when the disc is placed on any one of a plurality of different associated recording apparatuses for the recording of additional segments of data thereon. Some eccentricity errors in the associated recording apparatus may be due to spindle eccentricity, improper set up of a disc on the spindle of the recording apparatus, and manufacturing tolerances on the recording apparatus itself.

SUMMARY OF THE INVENTION

This invention relates to a method of recording data on a high-density, optical disc which involves the identification of each segment of data recorded thereon and also involves the use of a recording gap between adjacent segments of data which may be recorded on the disc at different times.

In general, the method of this invention comprises recording first data in a first portion of the tracks on the disc; recording at least a first reference file associated with the first data in a second portion of the tracks adjacent to the first portion, with the second portion including a last recording track; recording a character which is repeated in a third portion of the tracks adjacent to the last recording track to thereby signify the end of the first data and the associated reference file; and leaving a recording gap on the optical disc between the third portion and a fourth portion which fourth portion will subsequently be used for recording second or additional data thereon.

The character which is repeated in the third portion of the disc described in the previous paragraph provides an identification or notice to the associated reading means on which the disc is read that the next segment of data is about to be presented to the reading means.

The method of this invention provides for the recording of data on a high density disc, such as an optical disc, on a non-continuous basis without destroying prerecorded data thereon.

These advantages and others will be more readily understood in connection with the following detailed description, claims and drawing.

BRIEF DESCRIPTION OF THE DRAWING

FIG. 3 is a schematic diagram, in essentially block form, showing a typical disc recording means which may be used in the method of this invention; and FIG. 4 is a typical reading means which may be used to read the data recorded on the optical disc shown in FIGS. 1-4.

DETAILED DESCRIPTION OF THE INVENTION

Figure 1:
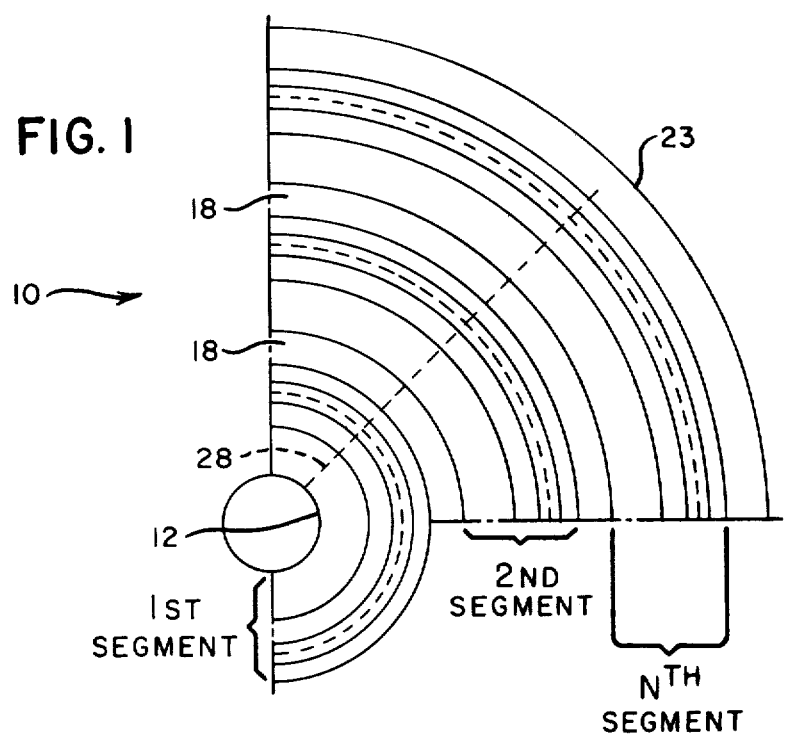
FIG. 1 is a plan view in schematic form of a portion of a high density optical disc which may be used with the method of this invention, showing the organization of first, second and third segments of data thereon, and showing a gap between the segments of data recorded thereon.

FIG. 1 is a plan view, in schematic form, of a portion of a high-density, optical disc designated generally as 10 which may be used with the method of this invention. In a preferred embodiment, the disc 10 is a substrate made of plastic material such as Mylar (manufactured by DuPont Inc.) which has a thin layer of reflective material thereover. The recording density of the disc 10 may be on the order of one hundred times that of a disc (not shown) of comparable dimensions on which data is recorded magnetically. Consequently, the disc 10 is capable of providing permanent storage of data at a low cost per bit when compared to "magnetic discs". Generally, there are about 15,000 tracks per inch as measured along a radial line on the disc 10.

In a particular application in which the method of this invention may be used, it is necessary to record data at different recording times and at low cost, and to provide a permanent record for this data which has to be readily accessed. The data, for example, may be a digitized image of the front and back of a check used in banking. When a customer at a particular banking location wishes to verify the signature on a check which is charged to his account, for example, it is necessary to locate the particular digitized image for the check on the disc 10, read the data associated with the check, and output the data just read to a display unit (not shown) which visually displays the image of the check to permit inspection by the customer, or the image displayed may be reproduced on a printer (not shown) associated with the display unit to produce a hard copy thereof. The organization of recording segments on the disc 10 facilitates accessing the associated data thereon, and facilitates the recording of segments of data thereon.

The disc 10 (FIG. 1) has a spindle hole 12 which is used to locate and mount the disc on a spindle 14 (FIG. 3) on a turntable 16 which is associated with a recording means designated generally as 20 in FIG. 3. Due to eccentricities in the spindle hole 12 and the spindle 14 and manufacturing tolerances for a plurality of recording means (like 20) on which the disc 10 may be placed for recording as previously stated, for example, it was possible to accidentally "record over" previously recorded segments of data on the disc 10 when recording was done on a non-continuous basis.

According to the method of the present invention, after recording a first segment (FIG. 1) on the disc 10, a gap 18 is left between the first segment and a second segment of data as shown.

The width of the gap 18 was determined by studying the eccentricities of the spindle hole 12, the manufacturing tolerances of the recording means 20, and the other factors mentioned earlier herein to ascertain an eccentricity factor which determines the width of the gap 18. From experimentation, it was determined that for an optical disc (like 10) having a recording density of 15,000 tracks per inch (as measured in a radial direction) a gap 18 having a width of approximately 15 tracks would provide the necessary separation between segments of data. This width of approximately 15 tracks for the gap 18 appears to be sufficient to compensate for the eccentricities mentioned in almost all optical disc recording operations. The gap 18 consists of a complete absence of data therein, and prevents any overlapping of recorded data without any great cost penalty due to a loss in available recording area.

The disc 10 (FIG. 1) may be of the type which has concentric recording tracks thereon, or it may be of the type which has one continuous spiral or recording track thereon, starting from the center of the disc and continuing to the outer edge thereof. Between each of the segments of data like the first and second segments up to the Nth segment of data near the outer edge of the disc 10, there is present a gap 18. Near the outer rim of the disc 10 there is located an "end of media" signal shown by line 23; this signal comprises a character which is repeated on the entire line 23. The "end of media" signal shown by line 23 is utilized by the recording means 20 (FIG. 3) to indicate to the recording means that only a few more record tracks remain on the disc 10. The recorder interface 52 then ascertains the amount of data yet to be recorded. If the remaining data to be recorded is a small amount, this small amount of data will be recorded, and subsequently, the associated index and directory files will be recorded on the disc 10. If the amount of data yet to be recorded is large, further recording of data is stopped and the associated index and directory files are immediately recorded.

Figure 2:
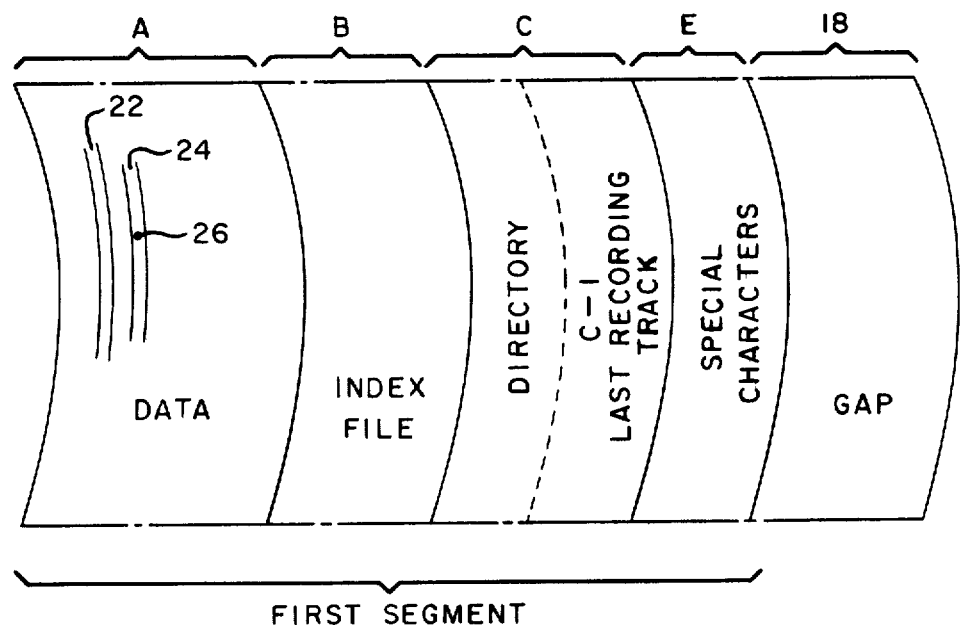
FIG. 2 is an enlarged, schematic, plan view of the first segment of data shown in FIG. 1, showing the organization of data and reference files included in that segment.

Each segment of data, like the first segment and the second segment of data (FIG. 1) may have the format shown in exaggerated size in FIG. 2 to facilitate the showing thereof.

The first segment of data, for example, starts out with a data portion included in bracket A as shown in FIG. 2. In the example being discussed, the data portion in bracket A may consist of a plurality of digitized images of the front and back of particular checks used in a banking system, as previously described. The recording area on the disc 10 is divided into a plurality of sectors (not shown) and each recording track like 22 and 24 within a particular sector is assigned its own logical sector number like sector #1 and sector #2, respectively to facilitate the retrieval of the associated data therein. In one embodiment of the disc 10, there are 30 sectors dividing the recording area thereon. Each of the tracks like 22 and 24 on the disc 10 has a mark like 26 which may be located along a radial line 28, shown as a dashed line in FIG. 1, to indicate the start and finish of the associated track when a spiral track is utilized on the disc 10. The mark such as 26 may be an "end of track binary decode" and the "start of track binary decode".

As the data in bracket A is being recorded on the disc 10, a conventional buffer 30 (FIG. 3) is utilized to prepare an index file shown in bracket B in FIG. 2 and a directory file shown in bracket C. The index and directory files provide the referencing means to access the data on the disc. The directory file has a last recording track C-1 which is followed by a single recording track (bracket E) which contains a single character which is repeated throughout the entire track to signify the end of the first recording segment. The nature of the index and director files shown in brackets B and C, respectively, will be discussed later herein.

FIG. 3 shows a conventional recording means 20 which may be used to record the data on the disc 10. Because the actual construction of the recording means does not form a part of this invention, it is described only generally herein. One such recording means is shown in a publication entitled "A Review of the MCA Disco-Vision system" by Kent D. Broadbent, which was presented on Apr. 26, 1974 at the 115th SMPTE Technical Conference and Equipment Exhibit in Los Angeles, Calif. Another recording means of the same general type is shown in U.S. Pat. No. 4,118,734 which isssued on Oct. 3, 1978.

The recording means 20 (FIG. 3) includes the turntable 16 and spindle 14 on which the disc 10 is mounted as shown. The turntable 16 is rotated in the direction shown by arrow 32 by a motor 34 which is mounted on a carriage 36. The carriage 36 is moved in opposed directions, as shown by arrow 38, along a radial line (like line 28 in FIG. 1) on the disc 10 by the carriage drive means 40. The carriage drive means 40 is controlled by the control means 42 to permit the recording head 44 to record data on the disc 10.

The recording means 20 also includes a laser 46 whose coherent light output is fed into a modulating device such as a Pockels Cell 48 which receives the signals 50 to be recorded via the buffer 30 and an associated recorder interface 52. The output of the Pockels Cell 48 is fed into the usual associated prism 54, optics 56, recording head 44, and lens 58 to provide a writing or recording beam 60 to the disc 10. A second laser 62 and associated optics 64 provides a "read after record" beam 66 which is coupled to a read photodiode 68 whose output is fed into the read means 70. The "read after record" beam 66 is actually positioned behind the recording beam 60 to check on the data actually being recorded on the disc 10; however, it is shown as being displaced from this position in FIG. 3 to facilitate the showing thereof. The "read after record" beam 66 may also be optically coupled to a tracking transducer 72 whose output is coupled to the control means 42 which controls the movement of the carriage drive means so as to enable the recording head 44 to record within the appropriate tracks on the disc 10.

A reading means designated generally as 74 in FIG. 4 may be used to read the disc 10. Because the reading means 74 is conventional, and not a part of this invention, it is described only generally herein.

The reading means 74 includes a spindle 76 and turntable 78 to receive the disc 10 as shown in FIG. 4. A motor 80 drives the turntable 78 in the direction shown by arrow 82. The motor 80 and turntable 78 are mounted on a carriage 84 and moved in opposed directions as shown by arrow 86 by a carriage drive means 88 which is under the control of a control means 90. The carriage drive means 88 operatively moves the disc 10 along a radial line thereon so as to position the appropriate tracks on the disc 10 under the reading head 92.

The reading means 74 (FIG. 4) also includes a laser 94 whose output beam passes through conventional optics including a lens 96, beam splitter 98, mirrors 102 and 104 and a prism 106 and objective lens 108 associated with the reading head 92. A reading beam 110 of light, reflected by the prism 106 is fed into an optical detector 112, whose output is fed to a reader output interface 114 via a signal buffer 116. A tracking beam of light 118 is fed into an associated tracking transducer 120 whose output is fed to the control means 90 to thereby enable accurate reading of the tracks on the disc 10.

When recording data on the disc 10, the recording means 20 shown in FIG. 3 may be used. A first portion of data coming from the recorder interface 52 is written into the data portion shown in bracket A for the first recording segment shown in FIG. 2. In general, the data may be recorded in binary form with a "hole" being burned in the disc 10 by the recording beam 60 representing a binary "1" and no hole representing a binary "0". Conventional coding techniques such as the "2 over 3" or double redundancy code may be used to insure the accuracy of the data being recorded. When recording on tracks which are in the form of concentric circles, each concentric circle or track is identified by a track number and each track contains a fixed number of logical sectors. When recording in tracks which are in the form of one continuous spiral, the track numbers or the logical sector numbers therefor can be designated by using the marks 26 (FIG. 2) previously mentioned. As the data in bracket A (FIG. 2) is recorded on the disc 10, the associated index and directory files are stored in the buffer 30 as previously explained, and after the data is written, the index and directory files in brackets B and C, respectively, (FIG. 2) are recorded on the disc 10. Thereafter, special characters such as the character Z or a character which is undefined are recorded in an entire track (in bracket E) to signify the end of the first recording segment shown in FIG. 2. If this is all the data to be recorded on the disc 10 at this time, the disc 10 may be removed from the recording means 20 and stored.

When additional data is to be recorded on the disc 10, the disc is retrieved from storage and is again placed on the recording means 20. The carriage drive means 40 positions the carriage 36 and the disc 10 thereon so that the recording head 44 is over the outermost track (at the rim of the disc 10) and then the carriage drive means 40 moves carriage 36 and the disc 10 so that the recording head 44 moves relatively in an inward direction towards the spindle hole 12 on the disc. As the carriage 36 moves the disc 10 in the inward direction, the read after record beam 66 is utilized to read the tracks on the disc 10 until a track containing the special characters (bracket E in FIG. 2) is encountered, thereby signifying that the first recording segment, in the example being described, is encountered. Thereafter, the carriage drive means 40 moves the carriage 36 and disc 10 in the opposite direction to provide the gap 18 (of approximately 15 tracks) between the first recording segment and the second recording segment as shown in FIG. 1. The recording of the second recording segment can then proceed as previously described.

When reading a disc 10, the disc is placed in the reading means 74 (FIG. 4) and reading is commenced from the outer rim thereof towards the center of the disc until a last recording track (like C-1 in FIG. 2) for a recording segment is encountered. The last recording track C-1 for a recording segment will indicate the location (logical sector number) of the associated index file by indicating the lowest sector number included in that file. The reading head 92 will then be positioned, relatively, at this logical sector number by the carriage drive means 88 to enable the index file (included in bracket B in FIG. 2) to be read by reading in a direction from spindle hole 12 of the disc 10 towards its outer rim. The index file (bracket B) contains the logical sector numbers or tracks for the particular data included in bracket A in FIG. 2. The carriage drive means 88 will then move the disc 10 so that the desired tracks are positioned under the reading head 92 and thereafter, reading can be commenced by reading in the direction going from the spindle hole 12 towards the rim of the disc 10. The data read can then be routed to the reader output interface 114 for use by a utilization device (not shown).

The last recording track C-1 in FIG. 2 contains the address of the directory shown within bracket C. At the end of this directory, a code therein would indicate whether or not one or more previously recorded segments of data are recorded on the disc 10. If there is a previously recorded segment of data thereon, the directory would indicate the address of the directory of the immediately prior segment of data. This type of linking exists for referencing all the prior recorded segments.

What is claimed is:

1. A method of recording data on a high-density, optical disc having a plurality of tracks therein, comprising:

recording first data in a first portion of said tracks on said optical disc;

recording at least a first reference file associated with said first data in a second portion of said tracks adjacent to said first portion, said second portion including a last recording track;

recording a character which is repeated in a third portion of said tracks adjacent to said last recording track to thereby signify the end of said first data and the associated first reference file;

leaving a recording gap on said optical disc between said third portion and a fourth portion which will subsequently be used for recording second data; and said step of leaving a recording gap comprising determining an eccentricity factor for said optical disc in relation to a means for recording and a means for reading said optical disc and leaving a predetermined approximate number of tracks between said third portion and said fourth portion in conformance with said eccentricity factor.

2. A method of recording data on a high-density, optical disc having a plurality of tracks therein, comprising:

(a) recording first data in a first portion of said tracks on said optical disc;

(b) recording a first reference file associated with said first data in a second portion of said tracks adjacent to said first portion;

(c) recording a second reference file in a third portion of said tracks adjacent to said second portion; said third portion including a last recording track;

(d) recording a character which is repeated in a fourth portion of said tracks adjacent to said last recording track to thereby signify the end of said first data and associated first and second reference files;

(e) leaving a recording gap on said optical disc between said fourth portion and a fifth portion which will be subsequently used for recording subsequent data;

(f) repeating said steps (a) through (d) for said subsequent data; and said step of leaving a recording gap comprising determining an eccentricity factor for said optical disc in relation to a means for recording and a means for reading said optical disc and leaving a predetermined approximate number of tracks between said fourth portion and said fifth portion in conformance with said eccentricity factor.

3. The method as claimed in claim 2 in which said recording steps are effected by focusing a beam of coherent light in said recording tracks to electro-optically record data therein.

4. A method of recording data on a high-density, optical disc having a plurality of tracks therein, comprising:

recording first data in a first portion of said tracks on said optical disc;

recording at least a first reference file associated with said first data in a second portion of said tracks adjacent to said first portion, said second portion including a last recording track;

recording a character which is repeated in a third portion of said tracks adjacent to said last recording track to thereby signify the end of said first data and the associated first reference file;

storing said optical disc when no additional data is to be recorded thereon;

retrieving said optical disc when additional data is to be recorded thereon;

reading said retrieved optical disc until a said third portion of said tracks is encountered, and thereafter, leaving a predetermined approximate number of tracks between said third portion of said tracks and a fourth portion of said tracks to provide a recording gap therebetween;

repeating said recording steps for second data by beginning the recording of said second data at said fourth position; and said leaving step comprising determining an eccentricity factor for said optical disc in relation to a means for recording and a means for reading said optical disc and leaving about 15 said tracks for said recording gap in conformance with said eccentricity factor.

5. The method as claimed in claim 4 in which said recording steps are effected by focusing a beam of coherent light in said recording tracks to electro-optically record data therein.

* * * * *